United States Patent [19]

Aberson et al.

[11] Patent Number: 4,940,307
[45] Date of Patent: Jul. 10, 1990

[54] OPTICAL FIBER SPLICE

[75] Inventors: James A. Aberson, Atlanta; Raymond P. DeFabritis, Lilburn; David N. Ridgway, Conyers; William A. Vicory, Duluth, all of Ga.

[73] Assignee: AT&T Bell Laboratories, Murray Hill, N.J.

[21] Appl. No.: 286,441

[22] Filed: Dec. 19, 1988

[51] Int. Cl.$^5$ .............................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,179,186 | 12/1979 | Tynes | 350/96.21 |
| 4,544,234 | 10/1985 | DeVeau, Jr. et al. | 350/96.21 |
| 4,647,150 | 3/1987 | DeSanti et al. | 350/96.21 |
| 4,717,233 | 1/1988 | Szkaradnik | 350/96.21 |
| 4,730,892 | 3/1988 | Anderson et al. | 350/96.21 |
| 4,763,970 | 8/1988 | Berkey | 350/96.21 |
| 4,787,697 | 11/1988 | Alrutz et al. | 350/96.20 |
| 4,818,055 | 4/1989 | Patterson | 350/96.20 |

Primary Examiner—Frank Gonzalez
Attorney, Agent, or Firm—Charles E. Graves

[57] ABSTRACT

Optical fiber repair splices are effected by mating two fiber ends in an elongate open-sided housing containing a fiber-receiving capillary tube. The tube may be factory-inserted to achieve a predetermined alignment of the tube with the fiber guide-way axis of the housing. A stepping fiber passage in the housing guides the fiber end into the tube. The fiber progresses to a point in the tube's interior where the capillary track is visible through a slot in the tube. The splicer visually observes mating of the fiber ends through the slot. The tube slot also permits application of index-matching material and adhesive to the mated fiber ends. During splicing, a mounting jig holds the underside of the housing, freeing the splicer to manipulate and view the fibers.

10 Claims, 4 Drawing Sheets

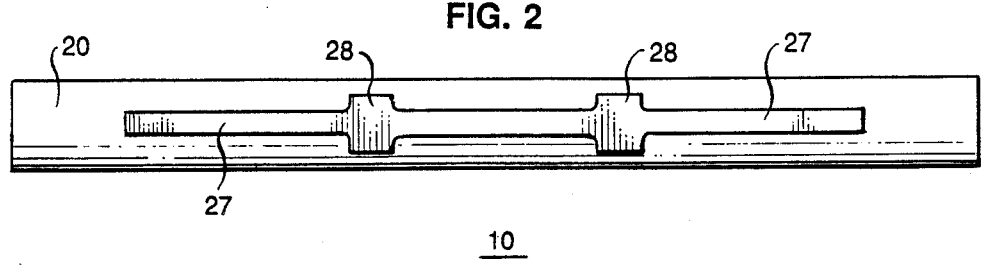
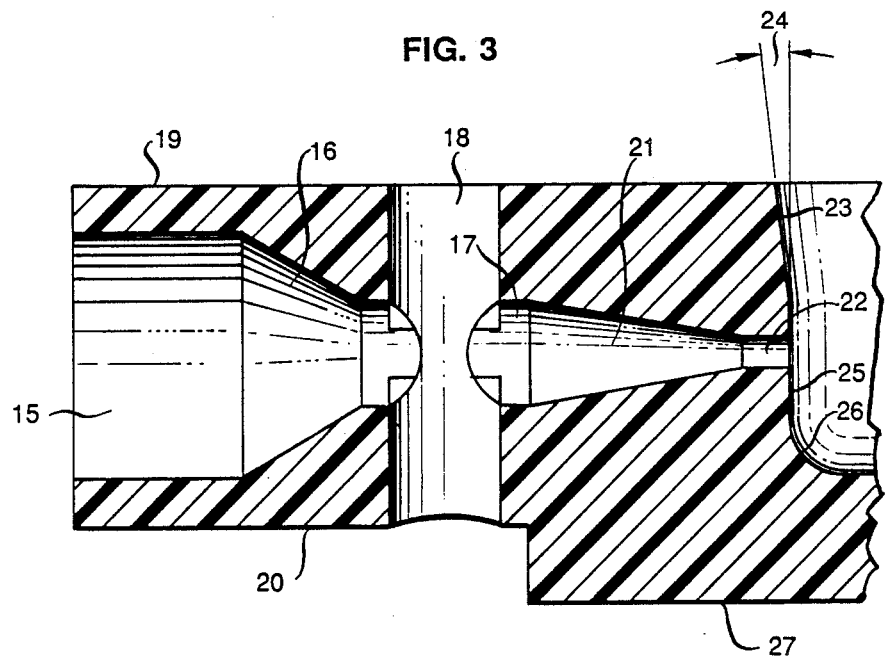

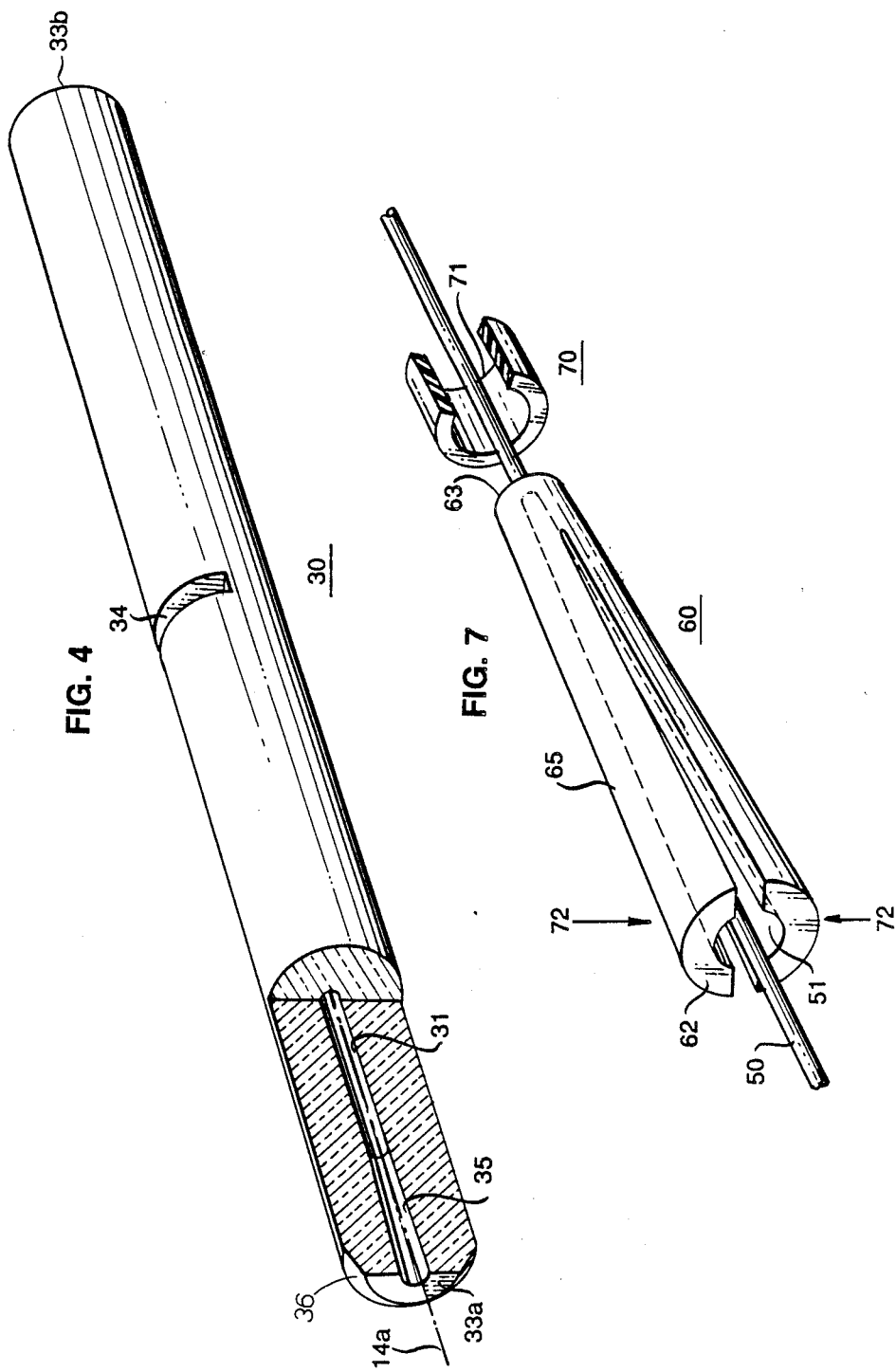

OPTICAL FIBER SPLICE

FIELD OF THE INVENTION

This invention relates to optical fiber joining and, particularly, to methodology and apparatus for effecting quick and inexpensive repair splices.

BACKGROUND OF THE INVENTION

Increasing incidents of massive damage to in-service optical fiber multipair cable have generated an urgent need for a reliable, quick and easy-to-use, low-toss temporary repair splice. Instances of the need for such a splice arise also in restoring fiber service in the loop plant and in LANs.

Existing optical fiber splicing connectors do not, however, achieve an optimum combination of low cost, ease of use, and reliability of result. Current optical fiber splices, for example, occasionally include means such as capillary tubes to assist in containing and precisely aligning the fiber ends in a splice. These typically are expensive or require complex or objectionable tooling to install.

A particular disadvantage of prior art repair splices is their susceptibility to misalignment of the fiber ends if the splice environment is subject to wide ranges of temperatures.

As optical fibers are deployed at an increasingly rapid pace in replacing wire or coaxial cable transmission media, the time is rapidly approaching when fibers will find important applications in the home. At that time an acute need will arise for inexpensive, reliable fiber splices which are adapted either to temporary or permanent service.

Accordingly, one object of the invention is to provide an optical fiber splice that can be produced inexpensively.

Another object of the invention is to create a splice connector which permits the application of the necessary index-matching fluid with little time and effort.

A further object of the invention is to effectively combine the fiber-aligning capability of the precision glass capillary tube, with a simple, effective means for temporarily housing the tube.

A further object of the invention is to provide an optical fiber splice which can serve as a temporary re-joining of severed fibers while having the capability to perform as a permanent splice as well.

A further object of the invention is to create a temporary optical fiber splice substantially resistant to the effect of thermal cycling which causes misalignment of fiber ends in a splice.

SUMMARY OF THE INVENTION

Repair splices are effected inexpensively pursuant to the invention by mating two fiber ends in an elongate open-sided housing containing a fiber-receiving capillary tube in alignment with the fiber guide-way axis of the housing. The capillary material, advantageously quartz, is chosen to have thermal expansion characteristics close to those of the fiber. Transverse and axial misalignments of the fiber ends due to thermal cycling, which degrade conventional splices, is avoided in this concept.

During insertion, a stepped fiber passage in the housing guides the fiber end from a relatively wide-entrance orifice to the ultimate interior alignment axis. The two fiber guide-way entrances are each intersected by a slot which permits a variety of fiber-securing mechanisms to be applied.

Pursuant to another aspect of the invention, a portable holding jig mateably secures the closed side of the housing, enabling the splicer readily to manipulate the tube and fiber during splicing.

Advantageously, the glass capillary tube is constructed of a glass such as quartz, which has a thermal expansion coefficient closely approximating that of the glass fibers to be spliced.

Additional objects, features, and advantages of the invention will be elucidated in the description to follow of an illustrative embodiment, and in the Drawing in which:

FIG. 2 is a view of the underside or bottom exterior portion of housing 10 showing ribs and feet details, useful in mounting the housing to a splicing jig;

FIG. 3 is a partial sectional side view of the housing;

FIG. 4 is a side perspective view in partial section of a glass capillary tube;

FIG. 7 is a schematic diagram of a mechanical fiber grip which secures the fiber to the housing and tube.

DETAILED DESCRIPTION OF AN ILLUSTRATIVE EMBODIMENT

Figure 1:
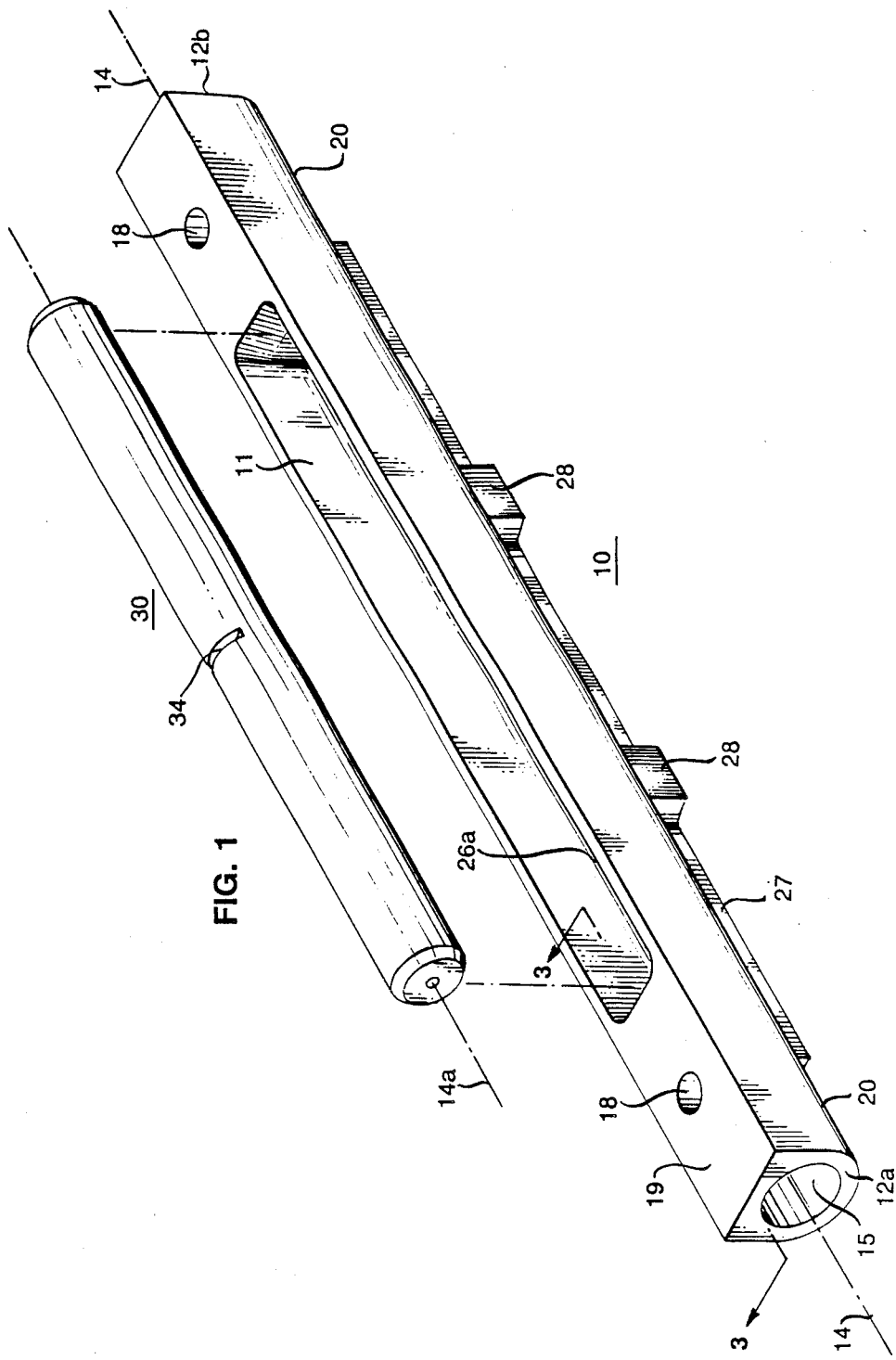
FIG. 1 is an exploded perspective view illustrating the housing and the fiber-containing tube of the invention.

As shown in FIG. 1, the invention is embodied in a housing 10 into which a capillary tube 30 is received. Housing 10 includes a central elongate recess 11 symmetrically located with respect to two end surfaces 12a, 12b. Recess 11 terminates in a floor 13 which is formed with concave corner sections 26 illustrated in FIG. 5, and a semi-circular cross-section 26a.

Figure 5:
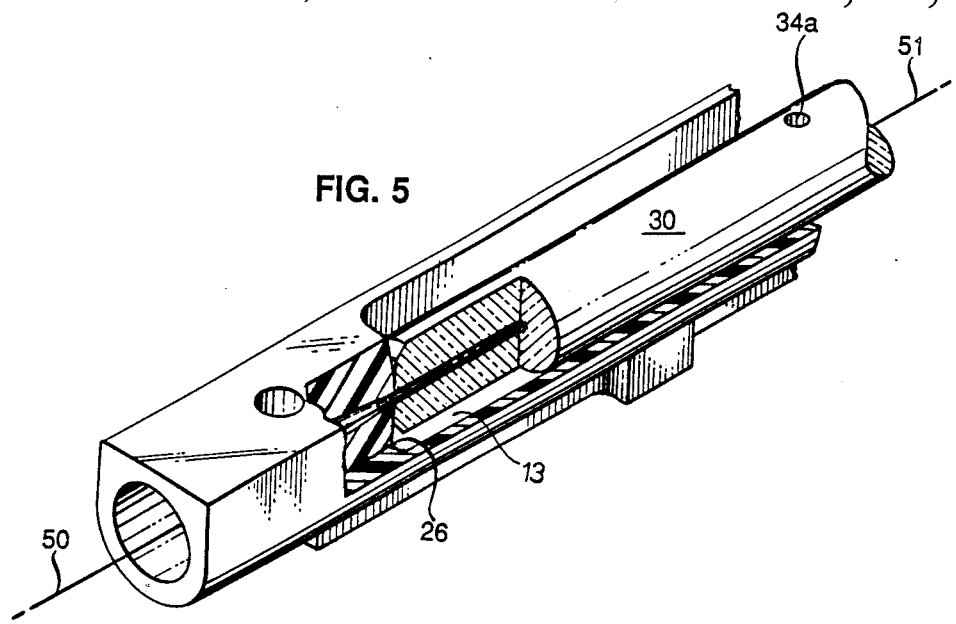
FIG. 5 is a partial sectional side perspective view of a housing with the capillary tube in position, and illustrating also a completed splice.

The semi-circular aspect 26a is formed with a radius which is substantially the same as that of the outer diameter of capillary tube 30. Thus, with the tube installed as illustrated in FIG. 5, the longitudinal axis 14 of the housing 10 and the longitudinal axis 14a of the tube 30 are substantially coincident. It is this coincident set of axes 14, 14a, along which the longitudinal axes of the optical fibers are positioned for splicing. As will be described below, with the fibers aligned in this axial position, the cleaved ends of the fibers can be brought together and clearly viewed in mating and fully contacting relation.

As illustrated in FIG. 3, the housing end surfaces 12a, 12b are each formed with a cylindrical fiber-receiving entranceway 15 that joins with a first inwardly-tapered section 16. Connecting to each of the sections 16 is a second cylindrical section 17. Each section 17 intersects and joins with an access 18 formed from the top surface 19 of housing 10 through to the underside of housing 10. Access 18 furnishes one means for applying adhesive to an interior portion of housing 10 to secure the installed fibers to the housing and tube thereby to fix the fiber ends in contacting relation.

Each cylindrical section 17 also connects with an inwardly-tapering section 21, which in turn connects to a final and short cylindrical section 22. The sections 22 open onto respective ends of recess 11.

The details denoted 15, 16, 17, 21, and 22 above, advantageously are formed with circular cross-sections. In combination, they furnish fiber passages from each housing end 12a, 12b along the common axis 14.

As seen in FIG. 3, the vertical interior end wall 25 of recess 11 joins with an upper end wall 23 that is formed with a slightly open angle denoted 24, to assist in installing tube 30 and also to provide a second means for applying adhesive to secure optical fibers and tube 30 onto housing 10. The housing floor 13 joins the vertical end walls 25 of housing 10 at the concave corners 26.

As seen in FIGS. 1 and 2, along the underside of housing 10 is formed a lengthwise rib 27 which includes two pairs of feet 28. These provide gripping surfaces to maintain the housing 10 in a repair splice jig, shown schematically in FIG. 6, enabling the worker to have both hands free for speedy splicing.

The fiber-mating tube 30 is an elongate, cylindrical glass capillary. These tubes are advantageously fabricated of quartz or other glasses. Tube 30 has a capillary track 31 formed along its longitudinal axis 14a. The interior diameter of track 31 advantageously should be approximately typical glass fiber.

Tapered entrance ways 35 at the two ends 33a, 33b of capillary track 31, illustrated in FIG. 4, are formed to capture and guide the fiber ends to their mating position. That position is at the intersection of the track 31 and a slot 34 formed in the capillary 30. Slot 34 advantageously extends substantially into the track 31. An alternative to the slot shape denoted 34, is the cylindrical cross-section orifice 34a, illustrated in FIG. 5. Index-matching fluid is applied to the fiber ends through slot 34 at the time of splicing.

As seen in FIGS. 1 and 5, the outside diameter of the tube 30 as well as its length are controlled to fit with little clearance into the semicircular floor 13 of recess 11. The bevels 36 formed at each of the tube ends 33a, 33b allow the tube 30, when positioned in the recess 11 preparatory to splicing, to make contact with the surface of fillet 26 as well as to rest on the floor 13. In this position, pursuant to one aspect of the invention, the location of the longitudinal axis 14a of the tube 30 is controlled in its placement with respect to the position of the axis 14 of the housing 10. This location can be coincident, or alternatively, offset by some predetermined advantageous distance.

Figure 6:
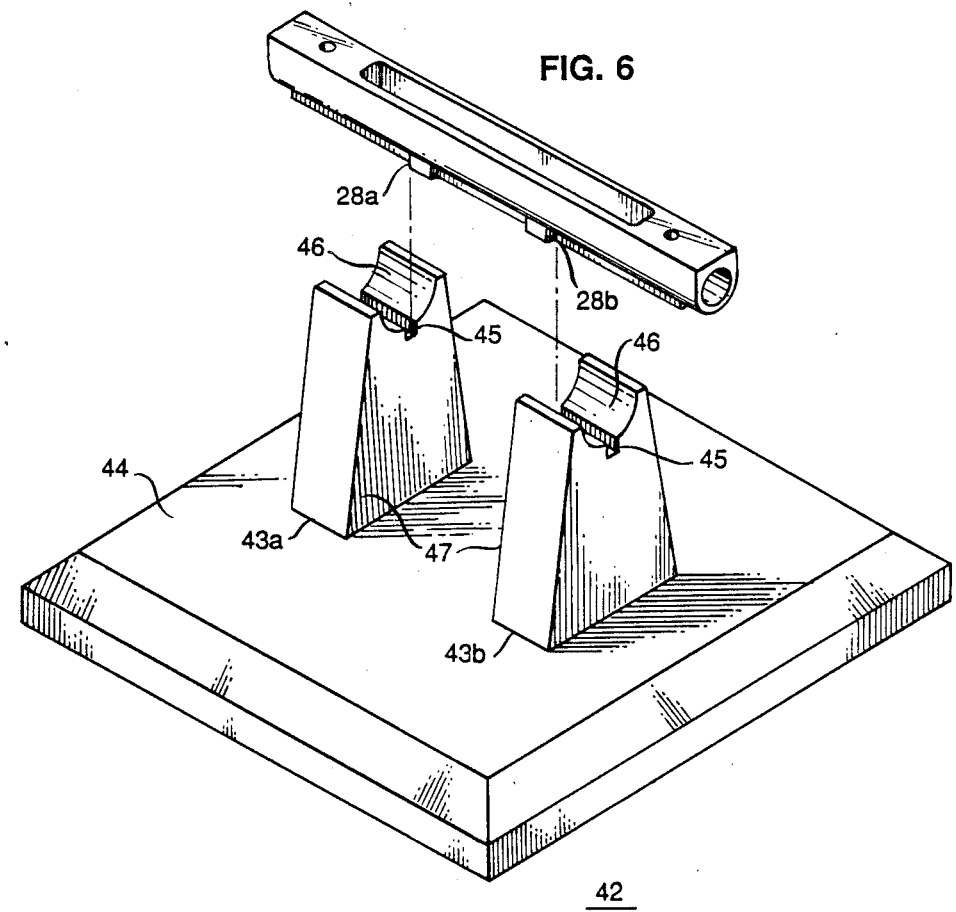
FIG. 6 is an isometric view of the housing and a plice jig.

The splicing operation is illustrated with reference to FIG. 6. Preparatory to the splice operation, the housing 10 with the tube 30 installed is positioned in a holding jig 42. Jig 42 consists of a pair of upwardly-extending arms 43a, 43b connected to a base 44. The end of each arm 43a, 43b is formed with slots 45 which receive the rib 27 of housing 10. In this position, the semicylindrically curved bearing surface 46 supports the similarly shaped bottom surface 20 of housing 10.

The distance between the two interior surfaces 47 of jig 42 is substantially the same as the distance between the exterior surfaces 28a, 28b of the feet 28 of housing 10. When mounted on the jig 42, the housing 10 thus is captured and restrained from either rotational or lateral movement.

The two fibers to be spliced are prepared by removing any protective coating material to expose the bare fiber. The ends of the fibers, such as fibers 50, 51 shown in FIG. 5, are prepared to create fiber end surfaces as flat, score-free, and perpendicular to the longitudinal axis of the fiber as possible. The fibers are then cleaned by removing protective coating residue to expose specified lengths of fiber, the length depending on the protective coating size. For example, if the coating outside diameter is 0.250 mm, the cleaned length should be approximately 12–13 mm.; for coating diameters of 1.0 mm. and 2.5 mm., the cleaned length should be 16–17 mm. and 19–20 mm. respectively.

Advantageously, the tube 30 can be inserted into the recess 11 in the factory, to further facilitate the field splicing. Now, with the slot 34 facing up, the housing 10 is placed in the jig, 42 in the manner shown in FIG. 6. The close geometric conformity of the tube 30 in relation to recess 11, forces the tube axis 14a and the housing axis 14 to be spatially coincident; or offset a predetermined amount at the time of factory installation.

Appropriately prepared fibers 50, 51 shown in FIG. 5, are introduced into the entranceways 15 of housing 10. The tapered sections 16 and 21 advantageously provide for alignment of the fibers along the alignment axis 14 in stages. As each fiber end approaches the slot 34 of tube 30, the splicer visually adjusts the insertion until each fiber end is positioned directly beneath the slot 34.

Index-matching fluid, advantageously of the type that cures to a gel with time, or cures with application of heat, is introduced into slot 34. Such fluid, available commercially as RTV silicone with a predetermined index of refraction, has an advantageously low modulus of elasticity and will effectively seal the splice once the gel cures.

To secure the splice, the fibers may be adhered to the housing 10 by applying an adhesive into accesses 18. Alternatively, the fibers may be affixed to housing 10 by mechanical means, as exemplified with reference to FIG. 7. A collet 60 is provided with a tapered interior passage 61 with an entrance 62 and an exit 63. An optical fiber 50 is inserted into and through passage 61 and positioned for splicing as earlier described.

Collet 60 includes a split 64, creating two opposing jaws which compress inwardly with the application of inwardly-directed radial force. The interior diameter of exit 63 is beyond the terminus of split 64, however, and therefore does not compress inwardly. The exterior surface 65 of collet 60 also is tapered. The collet 60 is secured at its exit end 63 to, or into, the housing 10 by means such as wedging or threads (not shown).

A compression ring 70 with an interior passage 71 rides on the collet exterior surface 65. By moving ring 70 along the tapered surface 65, the opposing jaws close around the fiber 50 in the direction denoted by the arrows 72. The jaws grip the fiber, thereby holding it in place until withdrawal of the ring 70 releases the jaws.

We claim:
1. Apparatus for effecting an optical fiber splice, comprising:
    an elongate housing comprising:
        a top surface;
        an open recess formed lengthwise into said top surface, said recess having a semicircularly shaped floor having a center axis and two end walls; and
        an elongate, cylindrical fiber-aligning glass member having a length substantially the same as the distance between said end walls of said recess, and having an exterior radius substantially the same as the radius of said semicylindrical floor of said recess, said member comprising a circular cross-section capillary track formed along the longitudinal axis of said member, the capillary track longitudinal axis and the center axis of said housing being in predetermined relationship when said member is disposed in said recess of said housing.

2. The apparatus of claim 1, wherein said housing further comprises a bottom surface comprising:
   means for mounting said housing onto a mating holding fixture.

3. The apparatus of claim 2, wherein said mounting means comprises:
   a lengthwise rib having two pairs of spaced apart feet disposed inwardly of said housing ends and at right angles to said rib, said rib and feet for mounting onto mating portions of a holding fixture.

4. The apparatus of claim 1, wherein said housing further commprises:
   end surfaces, each said surface containing a fiber entranceway; and
   a fiber-guide passage leading from each said housing end surface and intersecting a respective one of said vertical end wall portions, said passages comprising first and second inwardly-tapering sections and a cylindrical section separating and joining said tapering sections; and means for securing a spliced fiber to said housing.

5. The apparatus of claim 4, wherein said securing means comprises:
   a passage leading from said top surface of said housing and intersecting said cylindrical section joining said tapered sections; and
   adhesive means introduced into said last-named passage and thence into said last-named cylindrical section, for bonding said fiber and said housing and said tube together.

6. Apparatus in accordance with claim 1, wherein the interior diameter of said track is only nominally greater than the diameter of the glass fiber to be inserted therein, and wherein the entranceways to said track are flared.

7. Apparatus in accordance with claim 1, wherein said two recess end walls are formed substantially vertically with respect to said recess top surface at an interior portion of said walls, and said end walls join said top surface at an angle to create a relatively greater recess entrance at said top surface for installing said fiber-aligning glass member.

8. Apparatus in accordance with claim 1, wherein said glass member further comprises:
   access means between the longitudinal midpoint of said member exterior surface and said capillary track, comprising a slot through the wall of said member and communicating with the capillary track of said member.

9. A method for effecting a splice between two optical fibers, comprising the steps of:
   inserting each fiber end into opposite ends of a splice housing comprising a fiber-containing member having a capillary track disposed in axial pre-alignment in a recess of said housing;
   guiding each said fiber end to a central location on said track;
   inspecting through said fiber-containing member for fiber end-face alignment in said track; and
   securing said fibers in their desired end-face alignment.

10. The method of claim 9, comprising the further step of:
   holding said housing in a mounting device during said steps.

* * * * *

UNITED STATES PATENT AND TRADEMARK OFFICE
CERTIFICATE OF CORRECTION

PATENT NO. : 4,940,307

DATED : July 10, 1990

INVENTOR(S) : James A. Aberson, Raymond P. DeFabritis, David N. Ridgway, and William A. Vicory It is certified that error appears in the above—identified patent and that said Letters Patent is hereby corrected as shown below:

Abstract, Line 2 - change "elongate" to --elongated--.

Column 1, Line 12 - change "low-toss" to --low-loss--.

Column 2, Line 27 - change "and a plice" to -- and a splice--.

Column 3, Line 23 - change "approximately typical" to --approximately that of typical--.

Column 4, line 3 - change "mm," to --mm.,--.

Column 4, Line 13 - change "coincident;" to --coincident--.

Signed and Sealed this

Fourth Day of August, 1992

*Attest:*

DOUGLAS B. COMER

*Attesting Officer*     *Acting Commissioner of Patents and Trademarks*